(12) United States Patent
Baentsch et al.

(10) Patent No.: US 6,889,303 B2
(45) Date of Patent: May 3, 2005

(54) METHOD AND APPARATUS FOR DISTINGUISHING REACHABLE OBJECTS AND NON-REACHABLE OBJECTS IN AN OBJECT-BASED APPLICATION

(75) Inventors: Michael Baentsch, Albis (CH); Peter Buhler, Rueschlikon (CH); Eirich Thomas, Waedenswil (CH); Frank Hoering, Zurich (CH); Marcus Oestreicher, Zurich (CH)

(73) Assignee: International Business Machines Corporation, Armonk, NY (US)

(*) Notice: Subject to any disclaimer, the term of this patent is extended or adjusted under 35 U.S.C. 154(b) by 262 days.

(21) Appl. No.: 10/240,840

(22) PCT Filed: Mar. 9, 2001

(86) PCT No.: PCT/IB01/00329
§ 371 (c)(1),
(2), (4) Date: Feb. 19, 2003

(87) PCT Pub. No.: WO01/71506
PCT Pub. Date: Sep. 27, 2001

(65) Prior Publication Data
US 2003/0177327 A1 Sep. 18, 2003

(30) Foreign Application Priority Data
Mar. 24, 2000 (EP) .......... 00810253

(51) Int. Cl.[7] .......... G06F 12/02
(52) U.S. Cl. .......... 711/170; 707/206
(58) Field of Search .......... 711/170, 154; 707/206

(56) References Cited

U.S. PATENT DOCUMENTS

| | | | | |
|---|---|---|---|---|
| 6,272,504 B1 | * | 8/2001 | Baentsch et al. | 707/206 |
| 6,510,440 B1 | * | 1/2003 | Alpern et al. | 707/206 |
| 6,567,905 B2 | * | 5/2003 | Otis | 711/170 |
| 6,571,260 B1 | * | 5/2003 | Morris | 707/206 |
| 2004/0158589 A1 | * | 8/2004 | Liang et al. | 707/206 |

* cited by examiner

Primary Examiner—Hiep T. Nguyen
(74) Attorney, Agent, or Firm—Gregory M. Doudnikoff

(57) ABSTRACT

The invention is directed to a method for distinguishing reachable objects and non-reachable objects in an object-based application in a system with a volatile memory and a non-volatile memory. The object-based application operates in the non-volatile memory on the objects, whereof at least one is a root object. Each root object is processed by writing for each object that is reachable from the root object, a positive reachability information into the volatile memory and marking those objects in the non-volatile memory as reusable memory, for which no positive reachability information is present in the volatile memory.

15 Claims, 2 Drawing Sheets

METHOD AND APPARATUS FOR DISTINGUISHING REACHABLE OBJECTS AND NON-REACHABLE OBJECTS IN AN OBJECT-BASED APPLICATION

The invention concerns a method for identification and collection of memory sections that contain information not needed anymore, commonly referred to as garbage. This approach is well suited for use in systems with memory of limited size, such as integrated-circuit cards, e.g. smartcards.

TECHNICAL FIELD AND BACKGROUND OF THE INVENTION

Object-based application programs, e.g. written in Java, C++, or the like, usually operate on directed graphs. These graphs comprise root objects and regular objects which are interconnected by means of pointers. During the execution of an object-based application program the graph dynamically changes as objects and/or pointers are added, modified or removed.

Object-based execution environments often support the application developer in one of the most tedious and error-prone tasks in programming, namely memory-handling. In many systems, objects are only allocated by the application program, but never explicitly de-allocated. In these systems it is the task of a so-called garbage collector to determine which objects are no longer needed and to give the memory space occupied by those objects free for new objects. The garbage collector frees-up the respective memory and returns it to the heap of unused and hence usable memory. A garbage collector is designed to, every once in a while, clean up wasted memory. In addition, the garbage collector might be used to compact memory by eliminating the gaps created by fragmentation.

Cleaning up the garbage in memory is usually done in two steps, referred to as marking and sweeping. A known SUN Java garbage collector also uses the mark-and-sweep approach according to which every root object in the system is marked initially. Then one follows all the object references inside those objects to other objects not yet marked, and so on, recursively. Finally, when there are no more references to follow, all unmarked objects are deleted.

Current garbage collection schemes are not well suited for use in resource-constrained systems because these garbage collection schemes require more volatile memory than usually available in these kind of systems.

An integrated-circuit card, more widely known as smartcard, is one example of such a resource-constrained system. Other examples are mobile and/or hand held devices, such as cellular phones, pagers, personal digital assistants, personal area network devices, and so forth.

In the following, it will be focused mainly on ICCs and smartcards in particular. The smartcard concept began in Europe prior to 1985, and is today being used in telephone systems, toll roads, game parlors, and personal computers, just to mention some applications.

In the following, the term integrated-circuit card, short ICC, will be used, because ISO uses the term to encompass all those devices where an integrated-circuit is contained within a card-size piece of plastic, or the like. Typical ICCs comprise a microprocessor (central processing unit, CPU), a read-only memory (ROM), a volatile random-access memory (RAM), and some type of the non-volatile, programmable memory, such as an EEPROM (electrically erasable programmable read-only memory). In addition, an ICC usually comprises some kind of a bus (such as a serial bus) and I/O ports for interconnection to a card terminal.

The contents of the ROM-type of memory is fixed and cannot be changed once manufactured by the semiconductor company. This is a low-cost memory that occupies minimum space on the substrate. It is a disadvantage of a ROM that it cannot be changed and that it takes several months to be produced. As opposed to this, an EEPROM is erasable by the user and can be rewritten many times. ROMs and EEPROMs are the non-volatile. In other words, when the power is removed they still retain their contents.

A RAM is a volatile memory and as soon as the power is removed the data content is lost. A RAM, on the other hand, has the advantage that it is much faster writable to and readable from than ROMs and EEPROMs. A RAM is however more expensive in terms of die size. Usually, the RAM is relatively small. A RAM is typically not used for operations involving data that has to be kept permanent and consistent. Thereofor typically the non-volatile memory is used. Unfortunately, using the non-volatile memory for any and all operations has a couple of serious drawbacks. One is the extreme performance penalty that has to be paid as every memory write access is roughly 500 to thousand times slower when using an EEPROM instead of a RAM. An even more serious problem is the limitation on the amount of guaranteed write cycles, which is only 100000 times for an EEPROM.

In a resource-constrained system the volatile memory is usually significantly limited in size, and the computing power is as well significantly limited, e.g. because a small CPU is employed. Such resource-constrained systems usually also operate at low clock cycle rates.

OBJECT AND ADVANTAGES OF THE INVENTION

It is an object of the present invention to provide a garbage collection scheme which is well suited for use in resource-constrained systems.

It is a further object to provide a garbage collection scheme which has a reduced number of write-steps in the persistent memory.

SUMMARY OF THE INVENTION

The invention is directed to a method for distinguishing reachable objects and non-reachable objects in an object-based application in a system with a volatile memory and a non-volatile memory. The object-based application operates in the non-volatile memory on the objects, whereof at least one is a root object Each root object is processed by writing for each object that is reachable from the root object, a positive reachability information into the volatile memory and marking those objects in the non-volatile memory as reusable memory, for which no positive reachability information is present in the volatile memory.

The writing of the reachability information into the volatile memory has the advantage that it is faster and cheaper. Since lifetime of the persistent memory is limited much more than the lifetime of a volatile memory, the lifetime is lengthened with each write-step that is performed in the volatile memory instead of the persistent memory.

DESCRIPTION OF THE DRAWINGS

Examples of the invention are depicted in the drawings and described in detail below by way of example. It is shown in FIG. 1 a schematic view of an integrated-circuit card (ICC) with its main units, FIG. 2 an example for an arrangement of objects in an EEPROM with a corresponding reachability pattern in a RAM.

All the figures are for sake of clarity not shown in real dimensions, nor are the relations between the dimensions shown in a realistic scale.

DETAILED DESCRIPTION OF THE INVENTION

In the following, the various exemplary embodiments of the invention are described.

Figure 1:
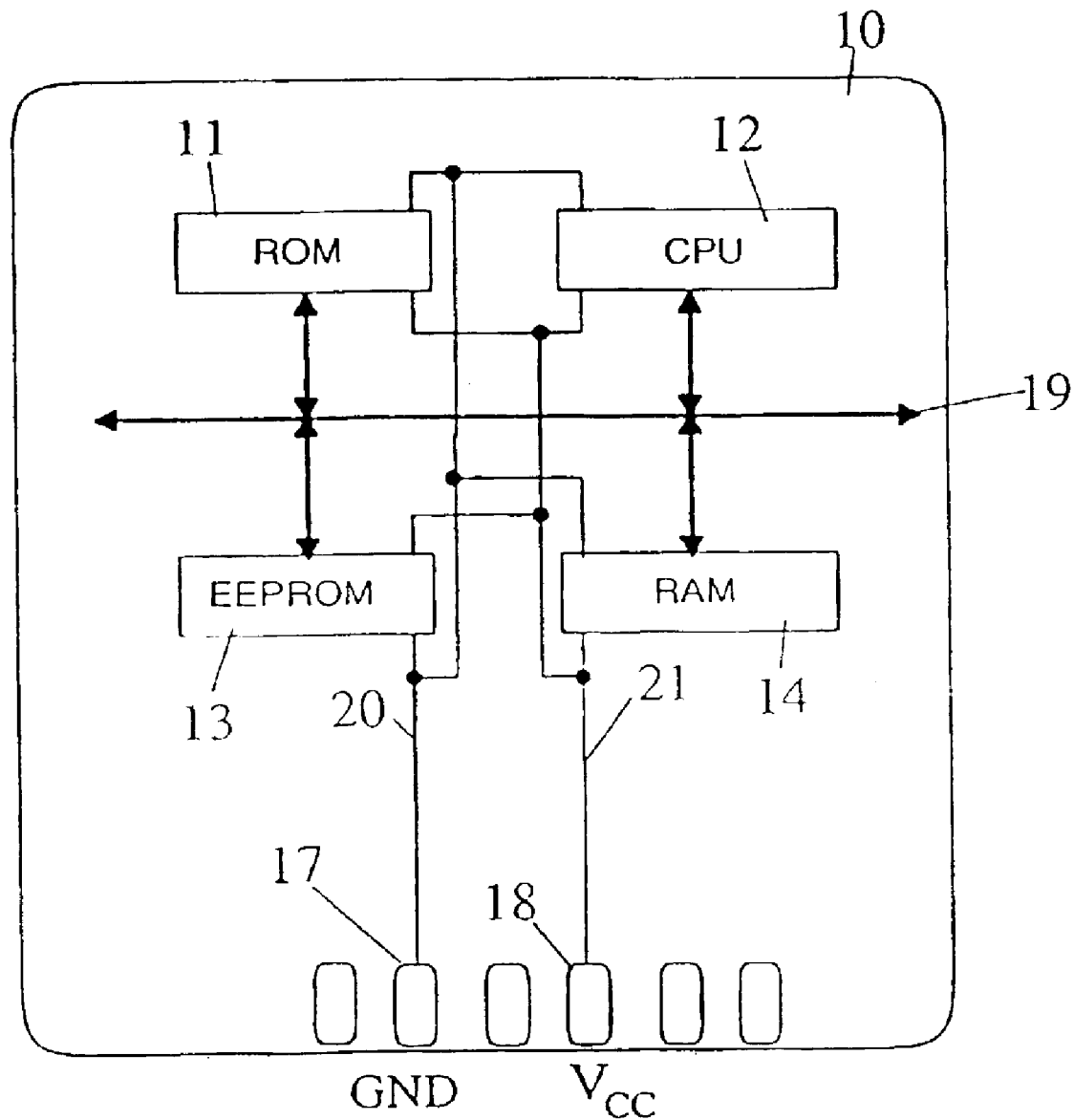

In FIG. 1 is depicted an ICC 10 which carries a microprocessor CPU 12, a first non-volatile memory, ROM 11, a second non-volatile memory, EEPROM 13, and a volatile memory, RAM 14, like most conventional ICCs.

The ICC 10 furthermore comprises an internal bus 19, connected to the CPU 12 and to the memories 11, 13, 14, allowing exchange of information and signaling between the ICC's components. The ICC 10 is a contact card with I/O ports, which are the interface for connecting to corresponding means of a card terminal. As indicated in FIG. 1, power is supplied via a ground port 17 (GND) and a positive voltage port 18 (VCC). Both ports 17, 18 are connected to the CPU 12 and the memories 11, 13, 14. In the ROM 11, the code of programs or an operating system is storable.

The invention concerns a garbage collection (GC) technique for use in systems with constrained resources. The following assumptions are made about the system executing the garbage collection technique:

There are two types of memory: the volatile memory 14 and the persistent i.e. non-volatile memory 13. The volatile memory 14 has following characteristics:

The available size of this volatile memory 14 is limited either because of the available physical memory or because only a limited amount of memory can be dedicated to the garbage collection task.

Reading from and writing to the volatile memory 14 is fast compared to read/write access to the non-volatile memory 13.

The non-volatile memory 13 has the following characteristics:

The non-volatile memory 13 holds a multiplicity of objects.

Writing to the non-volatile memory 13 is time-consuming compared to writing to the volatile memory 14.

The objects residing in the non-volatile memory 13 can be enumerated.

Each object comprises an object header 23 and an object payload 22. Object header 23 and object payload 22 need not be located in consecutive memory cells.

The object payload 22 is freely usable for any code while the object header 23 is dedicated to system tasks. During garbage collection some information is stored in the object header 23 of each object. The amount of information contributed by garbage collection to the object header 23 should be small since the object header 23 is overhead.

Typical examples for the volatile memory 14 are RAM or cache memory, and the non-volatile memory 13 could be an EEPROM, FlashRAM, or disk storage.

In an object-based environment, the non-volatile memory 13 typically contains a multiplicity of objects. Each object can be enumerated and accessed via a pointer, i.e. an address which allows to find the object. A pointer in this context is some datum which contains an object address that is said to refer to some object. Each object contains a possibly empty set of pointers to objects and a possibly empty set of other information not referring to any objects. Given some object A, it is possible to enumerate all pointers stored in this object A which refer to other objects. The objects are located in the non-volatile memory 13 and their pointers constitute a directed graph DG, as explained in more detail in relation to FIG. 2.

The purpose of garbage collection is to identify those objects that are no longer referenced by other still used objects. The memory space occupied by those identified obsolete objects can then be reused for other objects.

Some initial objects, also referred to as root objects, are known to be essential and thus not subject to garbage collection. This set of root objects is system-dependent and does not affect the present garbage identification- and collection scheme. This set of objects is referred to as the initial rootset IR.

Per definition, the objects reachable within the directed graph DG in the non-volatile memory 13 from the objects in the initial rootset IR are not deemed to be garbage. All objects which are not reachable from any object in the initial rootset IR are deemed to be garbage. Their memory space comprising object header and object payload, can be reclaimed by the system for new use, i.e. the space in the memory occupied by the object can be overwritten with other objects.

It is assumed a path TO in the directed graph DG starting from a current root object T and ending at some object O. The object T is said to be the first object in TO and the object O is said to be the last object thereof. The garbage identification- and collection scheme aims at making a distinction between reachable and non-reachable objects. For this purpose, the following states are maintained in the volatile memory 14:

the number Z of unprocessed root objects, this number being provided e.g. by means of a counter, the current root object T, a description of the path TO.

In the non-volatile memory 13 each object header might have two bits dedicated to the garbage collection scheme:

A VF bit (visited flag bit): this bit indicates whether an object has been visited during the current execution of the garbage collection algorithm. The definition of 0 and 1, meaning visited or not, can be altered to avoid the resetting of all object's VF bits after a garbage collection run. The VF bit is herein referred to as reachability information since it indicates, once the identification process has been performed, whether an object is tied via a pointer and maybe other objects and pointers to one of the root objects and hence can be reached therefrom or whether this object is decoupled from any root object and can not be reached. Here positive reachability information means VF=1 and negative reachability information means VF=0.

A RF bit (root flag bit): This flag indicates if an object is a root object which has not yet been processed. "RF set" or "RF=1" means the object is marked as root object and still needs to be processed.

In the following, the steps of an exemplary implementation of the garbage collection method are given. It essentially comprises a marking process followed by a memory-reclaiming process. Each object has an identifier, i.e. a name, number or the like.

1. All initial root objects in the initial rootset IR are marked unprocessed, i.e. with RF=1. The other objects have their RF flag reset to 0. The number Z of unprocessed root objects is set to the number of marked root objects.

2. If the number Z of unprocessed root objects is zero, then all objects in the non-volatile memory 13 are enumerated and the memory of those with the VF flag not set is reclaimed. This is the sweeping process or reclaiming process. Then the garbage collection process is terminated.
3. Otherwise the objects in the non-volatile memory 13 are enumerated and the first object which has its RF flag set is identified. This root object is referred to as first path object T for the path TO. It is also referred to as the current object C.
4. Then all pointers in the current object C are enumerated. If all pointers in the current object C have been processed in this step 4, the process continues with step 5. Otherwise, for each pointer referring to some object O which has its VF flag not set the following steps a to c are performed:
   a. The VF flag is set.
   b. If the volatile memory 14 is not exhausted, i.e. has enough space for adding the identifier of an object to the path TO, then the identifier of the current object C is added to the path TO and the referred object O is referred to as the new current object C. Step 4 is continued with the next referred object which has its VF flag not set.
   c. Otherwise, the RF flag of the referred object O is set and the number Z of unprocessed root objects is incremented. Step 4 is continued with the next pointer.
5. If the path TO is empty, the RF flag of the first path object T is reset and its VF flag is set. The number Z of unprocessed root objects is decremented. Then the process continues with step 2.
6. Otherwise, the identifier of the last object of the path TO is removed from this path TO. This removed object is defined as the new current object C. Then the process continues with step 4.

The garbage collection algorithm needs to have at least space to store paths of length 2 in the volatile memory 14. The step 4b handles all cases when the path TO is about to get longer than it is allowed to be. In such a case, the full path TO could not be stored and information about the beginning or the end of the path TO could get lost which would make the process faulty.

The longer the path TO can be, the faster is the execution of the garbage collection method, since less independent paths TO have to be processed. The state can further be minimized by choosing specific representations of the path TO in the volatile memory 14. A faster, but space-consuming representation would be a sequence of pointers referring to the objects of the path TO. As the set of possible pointers is usually bigger than the average number of pointers contained in objects, the following optimization can be applied:

Let r be the number of pointers in object O. r' is the minimum number which is bigger or equal to r and which is a power of two. Only log2(r') bits are needed to represent a path element from 0 to one of its referred objects Q Assuming that the pointer to some object Q is the i-th pointer in the object O then only the least log2(r) bits of the number i are stored in the path TO. The computation of the last object in some path TO is done by starting at its root T and following the i-th pointers from one object to the other object.

Since, as explained above, the writing to the persistent memory 13 is slow and expensive, the flag VF is better kept in the volatile memory 14. Therefore for each object in the persistent memory a marking information is created which contains the VF flag.

The marking information and the objects are preferably aligned with each other, i.e. the order of the pieces of marking information is the same as the order of the corresponding objects. In the following it is assumed that the marking information consists of a single bit, referred to as the VF bit.

1. Initially in the volatile memory 14 the space necessary for containing all VF bits of all possible objects is reserved and cleared, i.e. set to 0.
2. The above described marking process (steps 1, 3, 4, 5, 6) is performed, whereby the writing of the VF flags is not performed in the persistent memory 13 but they are written in form of the VF bits in the volatile memory 14. In the persistent memory 13 no writing activity related to the marking takes place.

Figure 2:
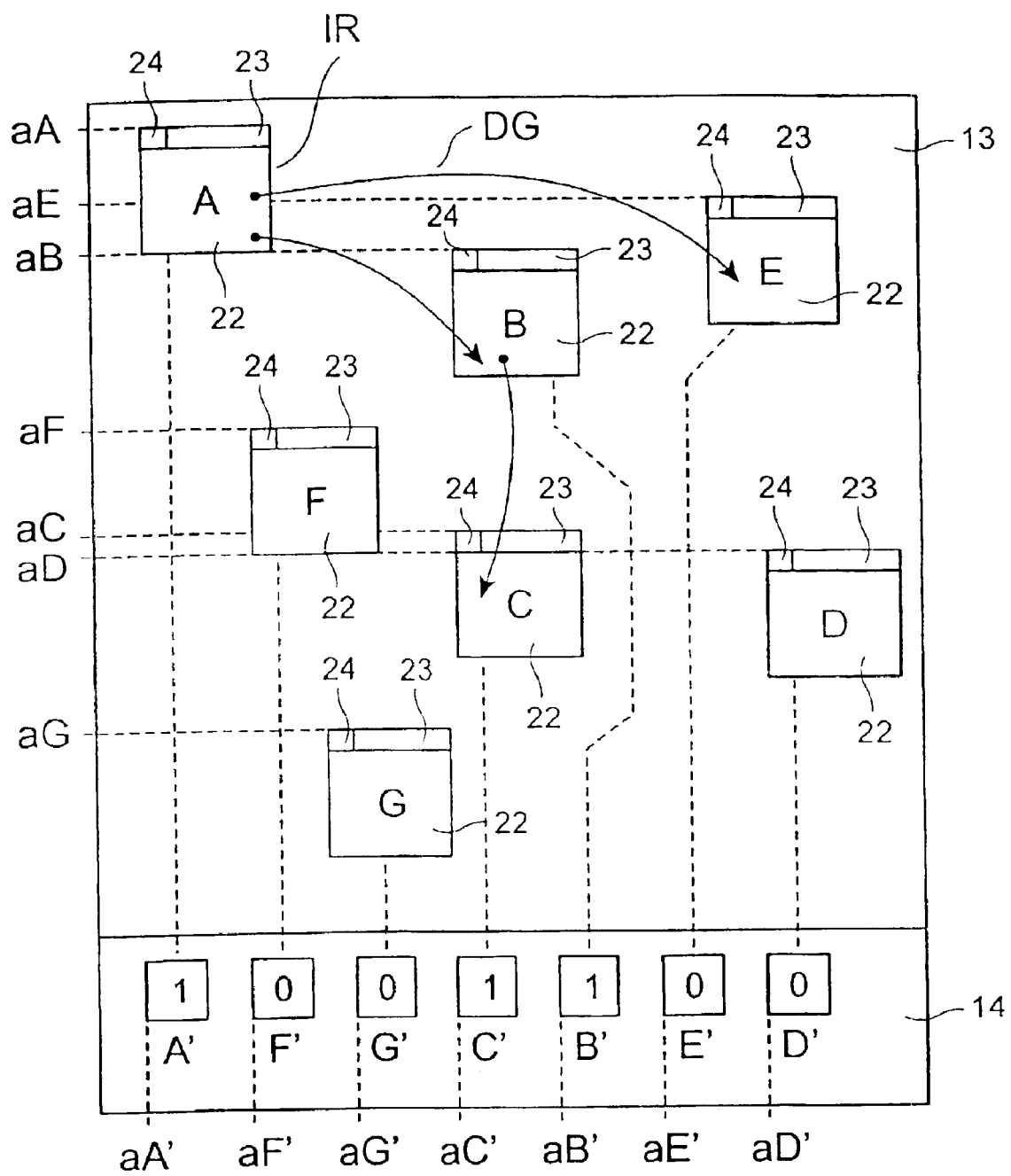

In FIG. 2 an exemplary arrangement comprising several objects A, B, C, D, E, F, G in the persistent memory 13 is depicted. Each of these objects A, B, C, D, E, F, G is positioned at a respective object address aA, aB, aC, aD, aE, aF, aG. For example the object A has as its start address in the persistent memory 13 the object address aA. The objects A, B, C, D, E, F, G are partially connected via the directed graph DG which here comprises a pointer from the object A to the object E and another pointer to the object B which again has a pointer to the object C. The objects D, F, G are not referred to by pointers. Only the object A is here an initial root object. The volatile memory 14 comprises for each object A, B, C, D, E, F, G the corresponding VF bits A', B', C', D', E', F', G' which are located in this volatile memory 14 at respective marking information addresses aA', aB', aC', aD', aE', aF', aG'.

There is a fixed relationship between the object address aA, aB, aC, aD, aE, aF, aG and the marking information addresses aA', aB', aC', aD', aE', aF', aG'. This relationship is such that with an algorithm for each object A, B, C, D, E, F, G the corresponding VF bits A', B', C', D', E', F', G' can be addressed. The relationship can be of the following kind:

All objects in the persistent memory 13 are aligned on a predetermined boundary thereof, e.g. an address that is a multiple of a number n. This number n then shall fulfill e.g. the equation $$n = (\text{size of the persistent memory})/8 * (\text{size of the volatile memory})$$

This fixed relation allows quick and uncomplicated access to the corresponding VF bits. Other relations are suited as well, as long as they are unambiguous in both directions.

The writing of the VF bit for a specific object O with its address aO is done by writing to aO/n. After performing the above described process, in the volatile memory 14 the bit pattern of all VF bits represents the accessability, resp. reachability of the objects A, B, C, D, E, F, G in the persistent memory 13.

The step 2 which contains the sweeping part, i.e. reclaiming, of the garbage collection process, is performed in that all objects whose VF bit is 0 are defined as garbage and their memory space is defined as free. This is typically done by changing the object header 23. In the case an object is present, the object header 23 contains a use information 24 which tells that the space following is occupied by an object A, B, C, D, E, F, G. The object header 23 gives also the size of the object A, B, C, D, E, F, G. Deleting an object A, B, C, D, E, F, G can hence simply be done by overwriting the use information 24 to then tell that no object A, B, C, D, E, F, G follows. Since writing is expensive in the persistent memory 13, it makes only little sense to overwrite the whole object A, B, C, D, E, F, G for deleting it. Making the system no longer interpret the memory space as object, has the same effect as deleting it, as regards memory occupation. For localizing the object A, B, C, D, E, F, G in the persistent memory 13, the fixed relation between the object address aA, aB, aC, aD, aE, aF, aG and the marking-information address aA', aB', aC', aD', aE', aF', aG' is again of use. Finding e.g. a VF=0 at the marking-information address aE', leads directly to the corresponding object address aE where the sweeping part therefor can be performed.

It is also of advantage to locate the RF flags in the volatile memory 14. Also the path TO should be located in the volatile memory 14 and even the number Z can be maintained there. Thereby the minimum of the writing operations is performed in the persistent memory 13, whereby the lifetime of the persistent memory 13 is lengthened and operation speed for the garbage collection process is increased.

For certain applications, especially on the smartcard area, it is important to to guarantee consistency of data even during power failure. This means that in case of sudden power loss and later restart, it shall be impossible that the state of the smartcard and its stored code is incorrect. This could for example occur, when a root object is marked as being processed before the processing of its referred objects is done and during this processing the power is lost. If the RF flag survives the power loss, but the process does not start at the same position, some objects could remain unprocessed and be regarded as garbage although they are valid and reachable objects. With the described scheme that uses the volatile memory 14 for the VF flags and possibly also the other information which is used during the garbage collection process, consistency is also guaranteed. The volatile memory 14 is emptied on power loss and hence no state from a previous garbage collection process run can influence a new run.

The present invention allows conventional. ICCs and other systems, and in particular resource-constrained systems, to be modified by simply integrating the essential components either as hardware, as software, or as a combination of hardware and software. The invention enables a variety of applications that identify those objects F, G, D which are not needed anymore. Once these objects F, G, D have been successfully identified, one can delete them to free-up the respective memory sections. Instead of deleting these objects F, G, D, one can add their pointers to a queue. The pointers in this queue then point to the sections in the persistent memory 13 which can be overwritten. Each time when memory space is required for storing an object, a pointer might be removed from the queue. Then the corresponding object is written into the memory section identified by the respective pointer.

One can also compact the persistent memory 13 once all non-reachable objects F, G, D have been identified. This is of advantage in the case the persistent memory 13 was fragmented.

In the described embodiment, the CPU 12 is the processor 12 including a counter for counting the number Z of root objects that were not yet processed and the reclaimer means for reclaiming those sections of the volatile memory 14 which contain the objects A, B, C, D, E, F, G which have no positive reachability information VF. It also comprises a defragmenter for the compacting step.

It is obvious for the person skilled in the art that the present invention can be realized in hardware, software, or a combination of these. Also, it can be implemented in a centralized fashion on one single computer system, or in a distributed fashion where different elements are spread across several interconnected computers or computer systems, whereby any kind of a computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Any disclosed embodiment may be combined with one or several of the other embodiments shown and/or described. This is also possible for one or more features of the embodiments.

It is obvious that a person skilled in the art can modify the shown arrangements in many ways without departing from the gist of the invention which is encompassed by the subsequent claims.

The present invention can be used in any kind of system in which an object-based application is executed. The invention is in particular suited for use in resource-constrained systems.

Typical resource-constrained systems are:
integrated-circuit card (ICC) (e.g. smart cards);
telephones;
set-top-boxes;
embedded controllers;
hand held devices;
portable computers;
personal area network (PAN) devices, etc.

What is claimed is:

1. A method for distinguishing, within a set of objects, reachable objects and not-reachable objects in an object-based application in a system with a volatile memory and a non-volatile memory, said object-based application operating in said non-volatile memory on said objects, wherein at least one of the objects is a root object, said method comprising the steps of:
   determining, for each of the root objects, which of the objects are reachable from said root object;
   writing, for each of the reachable objects, a positive reachability information into said volatile memory; and
   marking the objects, for which no positive reachability information is present in said volatile memory, in said non-volatile memory as reusable memory.

2. The method of claim 1, in further comprising the step of counting a number of root objects that have not yet been processed using a counter, said counter being maintained in said volatile memory.

3. The method of claim 1, comprising the step of operating on said objects having an object payload and an object header so that said object payload may comprise pointers to others of the objects.

4. The method of claim 1, further comprising the step of maintaining a flag in said volatile memory which indicates that one of the objects is a root object.

5. The method of claim 1, further comprising the step of, prior to said determining step, initializing all of the root objects to indicate that they have not yet been processed.

6. The method of claim 1, further comprising the step of reclaiming those sections of said volatile memory which contain objects which have no positive reachability information.

7. The method of claim 6, further comprising the step of rearranging those sections of said volatile memory that are reclaimed to compact said volatile memory.

8. The method of claim 1, wherein the reachability information is aligned in parallel to the objects and the objects are aligned at respective object addresses which are a multiple of a number n.

9. A system for distinguishing reachable objects and non-reachable objects in a set of objects in an object-based application, said system comprising:

a volatile memory;

a non-volatile memory;

wherein said object-based application operates in said non-volatile memory on said objects and at least one of said objects is a root object, means for writing, for each object that is reachable from each of said root objects, a positive reachability information into said volatile memory; and means for marking those objects in said non-volatile memory as reusable memory for which no positive reachability information is present in said volatile memory.

10. The system of claim 9, further comprising means for identifying an object from the objects which have not been marked because its path from said root object does not fit into said volatile memory as an object which has to be processed later.

11. The system of claim 9, further comprising a counter for counting the number of root objects that have not been processed, said number being stored in said volatile memory.

12. The system of claim 9, further comprising a reclaimer means for reclaiming those sections of said volatile memory which contain the objects which have no positive reachability information.

13. The system of claim 9, further comprising a defragmenter for compacting said volatile memory by rearranging those sections of said volatile memory which contain the objects which have no positive reachability information.

14. The system of claim 9, wherein said objects are kept in the non-volatile memory.

15. The system of claim 9, wherein the system is included in an environment having constrained resources.

* * * * *